US008718678B2

(12) United States Patent
Green et al.

(10) Patent No.: US 8,718,678 B2
(45) Date of Patent: May 6, 2014

(54) SELECTIVE DELIVERY OF PRESENCE MESSAGES FOR WIRELESS COMMUNICATION DEVICES

(75) Inventors: Douglas R. Green, Lenexa, KS (US); Jeremy R. Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 722 days.

(21) Appl. No.: 12/389,448

(22) Filed: Feb. 20, 2009

(65) Prior Publication Data

US 2010/0216489 A1    Aug. 26, 2010

(51) Int. Cl.
*H04W 24/00*    (2009.01)

(52) U.S. Cl.
USPC ................ 455/456.3; 455/466; 709/206

(58) Field of Classification Search
USPC .......... 455/404.2, 422.1, 440, 456.1, 574, 455/412.1, 412.2, 413, 466, 456.2, 456.3, 455/456.4, 456.5, 456.6, 456.7, 404.1, 455/414.1; 370/311; 719/318; 709/206, 709/207; 379/207.12, 913
See application file for complete search history.

(56) References Cited

U.S. PATENT DOCUMENTS

| | | | |
|---|---|---|---|
| 7,110,783 B2 * | 9/2006 | Bahl et al. ...................... 455/516 |
| 7,187,935 B1 * | 3/2007 | Day ............................. 455/456.2 |
| 7,230,933 B2 * | 6/2007 | Bahl et al. ...................... 370/311 |
| 7,353,034 B2 * | 4/2008 | Haney ............................ 455/457 |
| 7,359,496 B2 * | 4/2008 | Qian et al. ................. 379/201.07 |
| 7,403,775 B2 * | 7/2008 | Patel et al. ................... 455/432.1 |
| 7,412,044 B2 * | 8/2008 | Chavez et al. ................. 709/206 |
| 7,474,741 B2 * | 1/2009 | Brunson et al. ............ 379/88.17 |
| 7,536,437 B2 * | 5/2009 | Zmolek ........................ 709/206 |
| 7,539,508 B2 * | 5/2009 | Bahl et al. ...................... 455/522 |
| 7,620,404 B2 * | 11/2009 | Chesnais et al. ........... 455/456.1 |
| 7,640,300 B2 * | 12/2009 | Wohlgemuth et al. ........ 709/204 |
| 7,685,606 B2 * | 3/2010 | Chang ............................ 719/318 |
| 7,751,830 B2 * | 7/2010 | Iyer et al. .................... 455/456.1 |
| 7,756,534 B2 * | 7/2010 | Anupam et al. ............... 455/466 |
| 7,814,195 B2 * | 10/2010 | Dacosta ........................ 709/224 |
| 7,831,262 B2 * | 11/2010 | Bergstrom ................. 455/456.3 |
| 2005/0009537 A1 | 1/2005 | Crocker et al. |
| 2006/0030264 A1 * | 2/2006 | Morris ......................... 455/41.2 |
| 2006/0075091 A1 | 4/2006 | Beyda et al. |
| 2006/0149814 A1 | 7/2006 | Borella |
| 2006/0286993 A1 | 12/2006 | Xie et al. |
| 2007/0129084 A1 * | 6/2007 | Sylvain ...................... 455/456.1 |
| 2007/0189487 A1 | 8/2007 | Sharland et al. |
| 2007/0253340 A1 | 11/2007 | Varney et al. |
| 2008/0207218 A1 * | 8/2008 | Craine et al. .............. 455/456.1 |
| 2008/0208953 A1 | 8/2008 | Tian |

* cited by examiner

FOREIGN PATENT DOCUMENTS

| | | |
|---|---|---|
| EP | 1292081 | 3/2003 |
| EP | 1788762 | 5/2007 |

*Primary Examiner* — Michael Faragalla
*Assistant Examiner* — Gerald Oliver

(57) ABSTRACT

What is disclosed is a method for communicating a presence message from a presence server to a monitoring wireless communication device, wherein the presence message indicates a location-oriented status of a monitored wireless communication device. The method includes receiving the presence message from the presence server and determining if the monitoring wireless communication device is in an active mode. If the monitoring wireless communication device is in the active mode, the method includes transferring the presence message for delivery to the monitoring wireless communication device. If the monitoring wireless communication device is not in the active mode, the method includes applying filtering characteristics to the presence message, creating summary data of the presence message, and transferring the summary data of the presence message for delivery to the monitoring wireless communication device once the monitoring wireless communication device enters the active mode.

18 Claims, 5 Drawing Sheets

SELECTIVE DELIVERY OF PRESENCE MESSAGES FOR WIRELESS COMMUNICATION DEVICES

TECHNICAL FIELD

Aspects of the disclosure are related to the field of communications, and in particular, the selective delivery of presence messages for wireless communication devices in wireless communication networks.

TECHNICAL BACKGROUND

Wireless communication systems typically include equipment and networks for exchanging the communications of wireless communication devices. In addition to traditional communications, such as voice calls, the wireless communication devices can report location-oriented information related to the present location, personal activity, or destinations of the users of the wireless communication devices. This information is typically referred to as presence information, and transferred to a presence server which collects presence information for possibly many wireless communication devices. Another wireless communication device can then monitor this presence information by receiving presence messages from the presence server. For example, a mother could remotely monitor the activities of her family using this presence information.

However, as the number of monitored wireless communication devices or the amount of presence information increases, the monitoring wireless communication device can be overloaded with receiving presence information, leading to lower battery life of the monitoring wireless communication device, and increased loading on the communication system over which the presence information is transferred.

OVERVIEW

What is disclosed is a method for communicating a presence message from a presence server to a monitoring wireless communication device, wherein the presence message indicates a location-oriented status of a monitored wireless communication device. The method includes receiving the presence message from the presence server and determining if the monitoring wireless communication device is in an active mode. If the monitoring wireless communication device is in the active mode, the method includes transferring the presence message for delivery to the monitoring wireless communication device. If the monitoring wireless communication device is not in the active mode, the method includes applying filtering characteristics to the presence message, creating summary data of the presence message, and transferring the summary data of the presence message for delivery to the monitoring wireless communication device once the monitoring wireless communication device enters the active mode.

What is also disclosed is a communication system for communicating a presence message from a presence server to a monitoring wireless communication device, wherein the presence message indicates a location-oriented status of a monitored wireless communication device. The communication system includes a communication interface configured to receive the presence message from the presence server and a processing node configured to determine if the monitoring wireless communication device is in an active mode. If the monitoring wireless communication device is in the active mode, the communication interface is configured to transfer the presence message for delivery to the monitoring wireless communication device. If the monitoring wireless communication device is not in the active mode, the processing node is configured to apply filtering characteristics to the presence message and create summary data of the presence message, and the communication interface is configured to transfer the summary data of the presence message for delivery to the monitoring wireless communication device once the monitoring wireless communication device enters the active mode.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
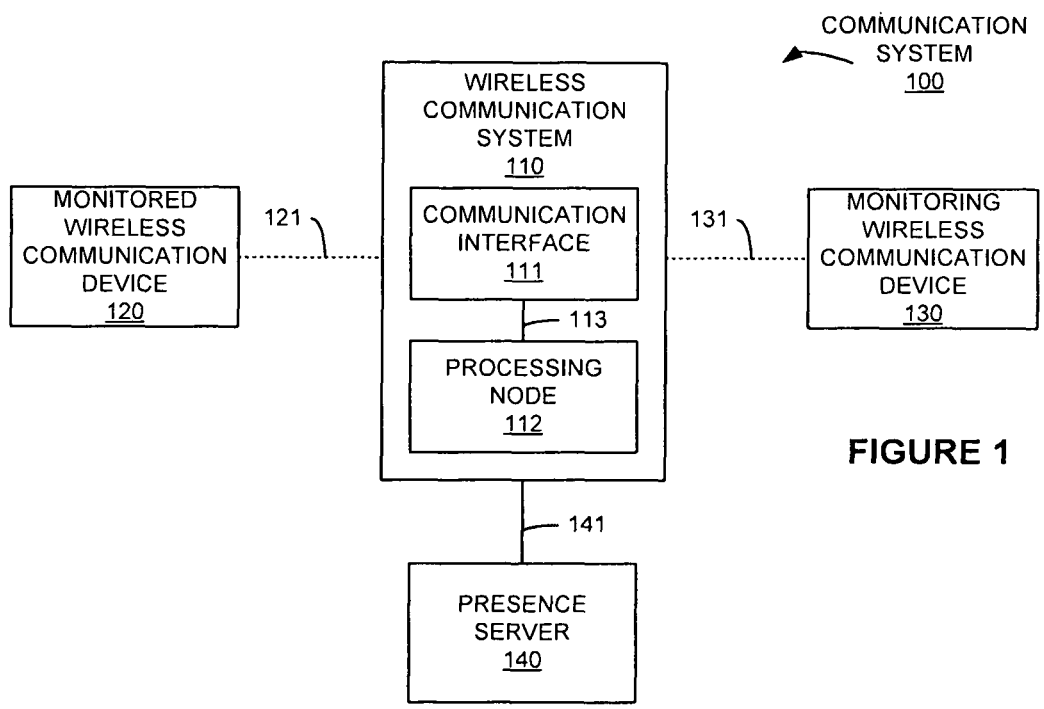
FIG. 1 is a system diagram illustrating a communication system.

FIG. 1 is a system diagram illustrating communication system 100. Communication system 100 includes wireless communication system 110, monitored wireless communication device 120, monitoring wireless communication device 130, and presence server 140. Wireless communication system 110 and monitored wireless communication device communicate over wireless link 121. Wireless communication system 110 and monitoring wireless communication device 130 communicate over wireless link 131. Wireless communication system 110 and presence server 140 communicate over link 141.

Wireless communication system 110 includes communication interface 111 and processing node 112. Communication interface 111 and processing node 112 communicate over link 113. Further examples of wireless communication system 110 can include access nodes, base stations, radio node controllers (RNC), packet data serving nodes (PDSN), authentication, authorization, and accounting (AAA) equipment, mobile switching centers (MSC), deep-packet inspection (DPI) equipment, call processing equipment, telephone switches, Internet routers, network gateways, as well as other type of communication equipment—including combinations thereof.

Communication interface 111 includes wireless communications equipment capable of communicating with, controlling, and the registration of wireless communication devices 120 and 130. Examples of communication interface 111 can include base stations, base transceiver stations, boomer stations, antennas, transceiver equipment, call processing equipment, wireless access points, Internet routers, network gateways, as well as other type of communication equipment—including combinations thereof.

Processing node 112 includes a computer system, microprocessor, circuitry, or some other processing device or software system, and may be distributed among multiple processing devices. In some examples, processing node 112 is located within the same equipment as communication interface 111, while in other examples, processing node 112 is part of core network equipment of wireless communication system 110. Processing node 112 may also include software such as an operating system, logs, utilities, drivers, networking software, and other software stored on a computer-readable medium.

Presence server 140 includes equipment for receiving presence information from monitored wireless communication device 120 and transferring presence messages to monitoring wireless communication device 130 over wireless communication system 110. Presence server 140 could include an application server, application service provider system, a computer system, or other systems. In many examples, presence server 140 is operated by a different service provider than wireless communication system 110.

Monitored wireless communication device 120 and monitoring wireless communication device 130 each comprise a telephone, transceiver, computer, digital assistant, smart phone, Internet appliance, or some other wireless communication apparatus—including combinations thereof. Although only one monitored wireless communication device 120 and one monitoring wireless communication device 130 are shown in FIG. 1, it should be understood that in other examples more wireless communication devices could be included in communication system 100.

Wireless links 121 and 131 each use various communication media, such as air, space, or some other wireless transport media—including combinations thereof. Wireless links 121 and 131 each use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless links 121 and 131 may each comprise many different signals sharing the same link. Wireless links 121 and 131 could each include multiple signals operating in a single airpath—as represented by the dashed lines in FIG. 1—comprising beacon signals, user communications, communication sessions, overhead communications, frequencies, timeslots, transportation ports, logical transportation links, network sockets, packets, or communication directions. For example, user communications between wireless communication device 130 and wireless communication system 110 could share the same representative wireless link 131, but be transferred over different communication sessions, frequencies, timeslots, packets, ports, sockets, logical transport links, or in different directions—including combinations thereof.

Links 113 and 141 use various communication media, such as air, space, metal, optical fiber, or some other signal propagation path—including combinations thereof. Links 113 and 141 could be wired or wireless and use various communication protocols such as Internet, Internet protocol (IP), local-area network (LAN), optical networking, hybrid fiber coax (HFC), telephony, T1, or some other communication format—including combinations or variations thereof. Links 113 and 141 could be direct links or might include various equipment, intermediate components, systems, and networks. Links 113 and 141 could include multiple signals operating in a single pathway in a similar manner as wireless links 121 or 131. In some examples, link 113 is a logical link between communication interface 111 and processing node 112, such as software link.

Figure 2:
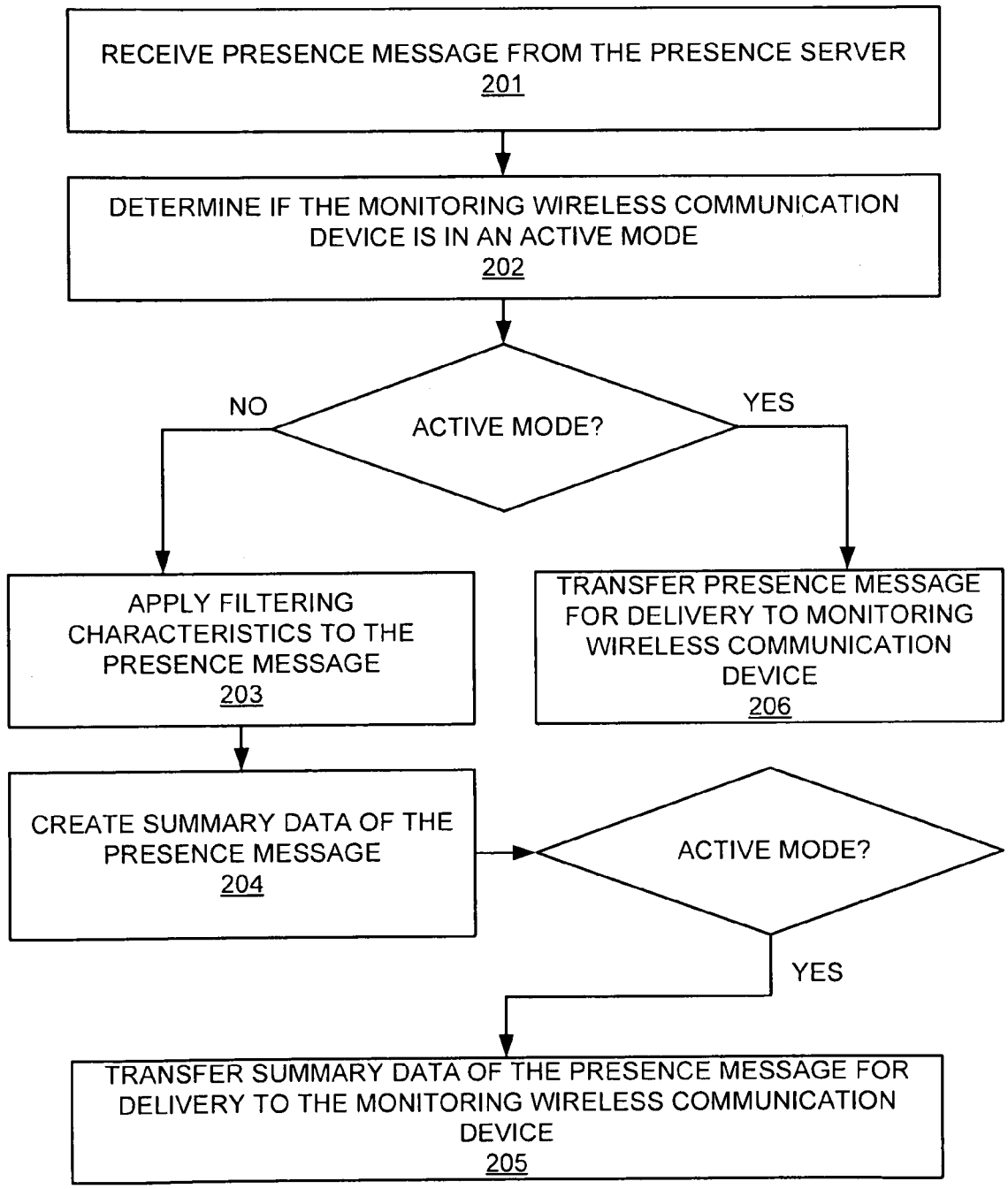
FIG. 2 is a flow diagram illustrating a method of operation of a communication system.

FIG. 2 is a flow diagram illustrating a method of operation of communication system 100, as found in FIG. 1. The operations shown in FIG. 2 are indicated herein parenthetically.

In FIG. 2, wireless communication system 110 receives (201) a presence message from presence server 140. In this example, communication interface 111 of wireless communication system 110 receives the presence message. Also in this example, presence server 140 communicates with wireless communication system 110 over link 141.

A presence message can report location-oriented or communication-oriented information related to the present location, personal activity, movement, destinations, or communication activity of the users of wireless communication devices. In this example, monitored wireless communication device 120 is being monitored, or watched, by monitoring wireless communication device 130. Presence server 140 collects presence information from monitored wireless communication device 120. Another wireless communication device, such as monitoring wireless communication device 130, can then monitor this presence information by receiving presence messages from presence server 140 over wireless communication system 110. The presence message could be a data packet, text message, email, or other message.

In this example, presence information is received by presence server 140 over link 141, through wireless communication system 110, from monitored wireless communication device 120. In other examples, presence server 140 could receive presence information associated with monitored wireless communication device 120 over other systems and communication links.

Wireless communication system 110 determines (202) if monitoring wireless communication device 130 is in an active mode. In this example, processing node 112 of wireless communication system 110 determines the operating mode of monitoring wireless communication device 130. Monitoring wireless communication device 130 could be in one of several operating modes. These operating modes reflect the state of the wireless communications over wireless link 131 and registration of wireless link 131 between wireless communication system 110 and monitoring wireless communication device 130.

One example of an operating mode includes where monitoring wireless communication device 130 is active and exchanging communications with wireless communication system 110, such as during voice calls, data services, or other communications. An active mode can also be maintained when monitored wireless communication device 130 is not presently exchanging communications with wireless communication system 110, such as between communication exchange periods. In many examples of the active mode, monitoring wireless communication device 130 operates using a higher level of power than other modes of operation, and is able to wirelessly receive or transmit user communications.

Another example operating mode includes an idle mode, where monitoring wireless communication device 130 is not wirelessly exchanging communications with wireless communication system 110, but a registration state with wireless communication system 110 is retained. In examples of an idle mode, monitored wireless communication device 130 could maintain timing characteristics, channel identifiers, frequency assignments, channel assignments, or otherwise remain registered with wireless communication system 110. While in the idle mode, monitoring wireless communication device 130 could revert to an active mode in response to commands wirelessly transmitted by wireless communication system 110 over wireless link 131 without having to proceed through a registration process with wireless communication system 110. In many examples of the idle mode, monitoring wireless communication device 130 requires lower power consumption than an active mode. If monitoring wireless communication device 130 is in an idle mode, wireless communication system 110 could bring monitoring wireless communication device 130 into an active mode of operation when communications are transferred to monitoring wireless communication device 130. The transition to an active mode from an idle mode could also be prompted by monitoring wireless communication device 130 desiring to transmit communications to wireless communication system 110.

Other operating modes of monitoring wireless communication device 130 could include a sleep mode where the registration of monitoring wireless communication device 130 is not retained. Once monitoring wireless communication device 130 desires to exchange communications with wireless communication system 110, monitoring wireless communication device 130 must first proceed through a registration process with wireless communication system 110. This registration process could include establishing wireless service with wireless communication system 110, such as establishment and assignment of communication timing, frequencies, channels, identifiers, or other wireless communication registration information. In many examples, the registration process is a lengthy and power-intensive process compared to the exit from an idle mode where registration is retained. In other examples, such as when monitoring wireless communication device 130 is powered off, a similar registration process must occur prior to monitoring wireless communication device 130 reaching an active mode of operation.

If monitoring wireless communication device 130 is in an active mode, wireless communication system 110 transfers (206) the presence message for delivery to monitoring wireless communication device 130. In this example, communication interface 111 of wireless communication system 110 transfers the presence message for delivery to monitoring wireless communication device 130 over wireless link 130.

However, if monitoring wireless communication device 130 is not in an active mode, wireless communication system 110 applies (203) filtering characteristics to the presence message and creates (204) summary data of the presence message. In this example, processing node 112 of wireless communication system 110 applies the filtering characteristics to the presence message and creates the summary data of the presence message. In many examples, wireless communication system 110 does not transfer the presence message for delivery to monitoring wireless communication device 130 when monitoring wireless communication device 130 is not in an active mode.

The filtering characteristics could include selective characteristics which determine when a presence message would be transferred for delivery to monitoring wireless communication device 130 or when the presence message would be withheld from delivery. In some examples, the filtering characteristics allow the presence message to be transferred for delivery to monitoring wireless communication device 130 when the presence message is associated with a high priority, and withholding the presence message from transfer for delivery to monitoring wireless communication device 130 when the presence message is associated with a low priority.

These priorities could be based upon a type of presence message, the content of a presence message, an identity associated with the presence message, or other factors. An identity associated with the presence message could correlate a person to a particular wireless communication device. For example, monitored wireless communication device 120 could be used by a teenager, and monitoring wireless communication device 130 could correspond to the teenager's mother. In other examples, a high priority presence message could be related to an emergency situation, such as notification of an accident detected by monitoring wireless communication device 120 or presence server 140 to monitoring wireless communication device 130.

In many examples where the filtering characteristics allow a high priority presence message to be transferred for delivery to monitoring wireless communication device 130, the presence message delivery could bring monitoring wireless communication device 130 into an active mode from another mode, such as an idle mode. In examples where the presence message is not transferred for delivery to monitoring wireless communication device 130, wireless communication system 110 thus prevents the presence message from causing monitoring wireless communication device 130 to enter an active mode if monitoring wireless communication device 130 is not in an active mode.

In further examples, wireless communication system 110 could maintain an active communication session, subscription session, or other state with presence server 140, acting on behalf of monitoring wireless communication device 130 when monitoring wireless communication device 130 is not in an active mode. In this manner, wireless communication system 110 would allow monitoring wireless communication device 130 to remain in an idle mode while still having presence server 140 continue to transfer the presence message for delivery to monitoring wireless communication device 130 as if monitoring wireless communication device 130 was in an active mode. The filtering characteristics could then be applied to the presence message.

Figure 5:
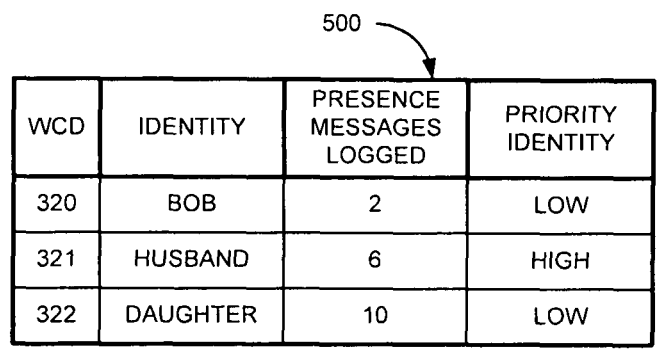
FIG. 5 is a table illustrating example presence message summary data.

The summary data could include information summarizing the presence message, such as a brief amount of information related to the presence message received by wireless communication system 110 while monitoring wireless communication device 130 was in an idle mode. This information could include an identity of the wireless communication device or user associated with the presence message. In further examples, many presence messages could be received by wireless communication system 110 while monitoring wireless communication device is in an idle mode. The summary data could then indicate a brief amount of information related to all presence messages received by wireless communication system 110 while monitoring wireless communication device 130 was in an idle mode. A further example of the summary data is illustrated in FIG. 5.

Additionally, in some examples, when monitoring wireless communication device 130 is not in the active mode, wireless communication system 110 could maintain a log of the presence message. This log could be used to create the summary information, or could be based upon the summary information. The log could contain a timestamp of the presence message, along with other information related to the presence message. In examples where many presence messages are received, the log could contain information related to many presence messages.

Then wireless communication system 110 transfers (205) the summary data of the presence message for delivery to monitoring wireless communication device 130 once monitoring wireless communication device 130 enters the active mode. In this example, communication interface 111 transfers the summary data for delivery to monitoring wireless communication device 130. As discussed above, the summary data could be a shortened representation of the presence message, such as an identity and time associated with the presence message. In examples where many presence messages were received by wireless communication system 110 when monitoring wireless communication device 130 is in an idle mode, the summary data could allow a user of monitoring wireless communication device 130 to quickly tell which presence messages were important or interesting. These presence messages received when monitoring wireless communication device 130 was in an idle mode are considered missed presence messages.

In some examples, wireless communication system 110 stores the presence messages when monitoring wireless communication device 130 is in an idle mode for later delivery to monitoring wireless communication device 130. The user of monitoring wireless communication device 130 could then request an entire presence message from wireless communication system 110 once the summary data is transferred and reviewed. In further examples, monitoring wireless communication device 130 could request a presence message be retransferred from presence server 140. In yet further examples, wireless communication system 110 could allow the user of monitoring wireless communication device 130 to browse the missed presence messages, or a log of the presence messages, over another interface, such as over the Internet or a web-based interface.

Advantageously, by determining when monitoring wireless communication device 130 is in an idle mode, presence messages can be withheld from delivery, thus allowing monitoring wireless communication device 130 to remain in an idle mode. By remaining in an idle mode, monitoring wireless communication device 130 could reduce power consumption, or reduce the frequency of interruptions by presence messages, among other advantages.

Additionally, the user of monitoring wireless communication device 130 could be allowed to set the filtering characteristics to allow only presence messages of a certain priority from interrupting the idle mode. For example, emergency presence messages could be allowed to be transferred for delivery to monitoring wireless communication device 130, while non-emergency presence messages could be withheld. After monitoring wireless communication device 130 enters an active mode, the summary data is transferred, which allows the user of monitoring wireless communication device 130 to quickly review the presence messages missed while in the idle mode. Advantageously, if a large number of presence messages were missed while in idle mode, the large number of presence messages would not have to be transferred to monitoring wireless communication device 130. This is especially relevant when the presence messages are of a temporary nature, where a late receipt renders the presence messages less useful.

Furthermore, in examples where wireless communication system 110 maintains an active communication session with presence server 140, the presence messages could continue to be received by wireless communication system 110 in lieu of interrupting an idle monitoring wireless communication device 130. Thus, wireless communication system 110 could acknowledge receipt of the presence messages, allowing presence server 140 to continue to function as if monitoring wireless communication device 130 was in an active mode. Advantageously, presence server 140 would not have to contend with non-delivered presence messages, or have to attempt a re-send of presence messages when monitoring wireless communication device 130 is in an idle mode, thus reducing the overall traffic level of communications across wireless communication system 110.

Figure 3:
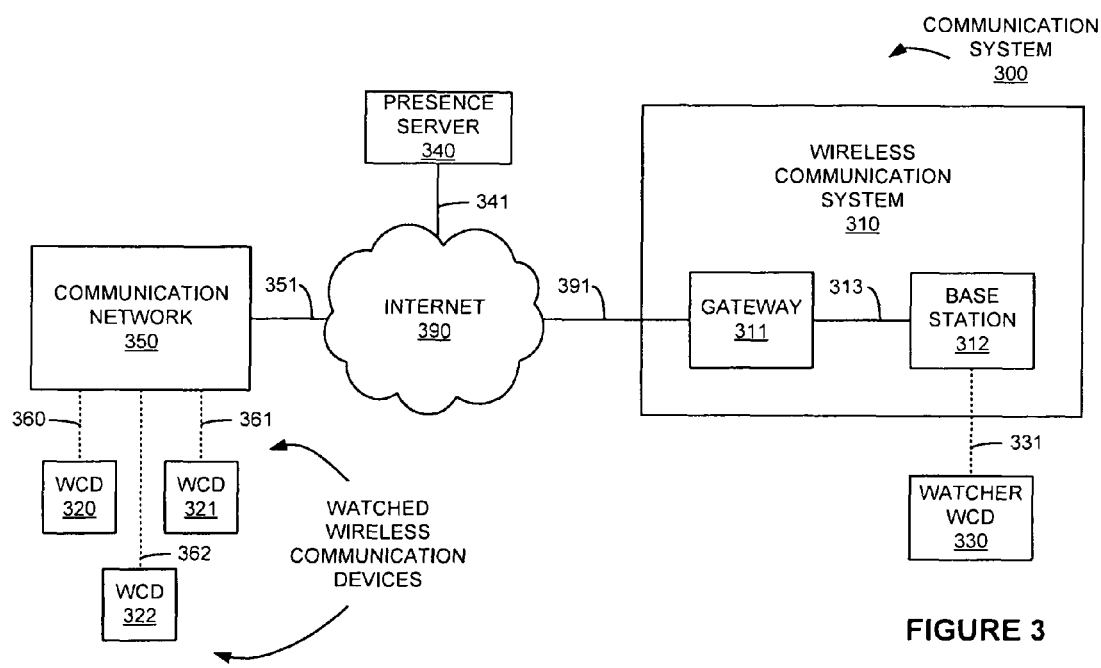
FIG. 3 is a system diagram illustrating a communication system.

FIG. 3 is a system diagram illustrating communication system 300. Communication system 300 includes wireless communication system 310, communication network 350, Internet 390, presence server 340, watcher wireless communication device (WCD) 330, and watched WCDs 320-321.

Wireless communication system 310 and watcher WCD 330 communicate over wireless link 331. Wireless communication system 310 and Internet 390 communicate over link 391. Communication network 350 and Internet 390 communicate over link 351. Internet 390 and presence server 340 communicate over link 341. Communication network 350 and WCDs 320-322 communicate over wireless links 360-362, respectively. Wireless links 331 and 360-362, in this example, each use the code division multiple access (CDMA) wireless protocol. Links 313, 341, 351, and 391 each comprise a T1 connection, capable of transferring Internet protocol data packets, in this example.

Wireless communication system 310 includes gateway 311 and base station 312, which communicate over link 313. Communication network 350 includes Internet router equipment for transferring presence information associated with watched WCDs 320-322 for delivery to presence server 340 over Internet 390.

Gateway 311 includes communication equipment for routing Internet communications between base station 312 and Internet 390. Gateway 311 also includes a computer system, microprocessor, circuitry, or some other processing device or software system, and may be distributed among multiple processing devices. Examples of gateway 311 may also include software such as an operating system, logs, utilities, drivers, networking software, and other software stored on a computer-readable medium. Gateway 311 could also include data packet inspection equipment, such as deep-packet inspection (DPI) equipment.

Base station 312 includes wireless communications equipment, antennas, and transceivers capable of communicating with, controlling, and registering wireless communications of watcher WCD 330.

Presence server 340 includes equipment for receiving presence information from watched WCDs 320-322, then composing and transferring presence messages to watcher WCD 330 across Internet 390. In this example, presence server 340 could include a communications interface for receiving presence information from watched WCDs 320-322 over communication network 350, a computer system, and a communications router for transferring presence messages over Internet 390. In this example, presence server 340 is operated by a different service provider than wireless communication system 310.

Watched WCDs 320-322 and watcher WCD 330 each comprise smart phones in this example. Although one watcher WCD 330 and three watched WCDs 320-322 are shown in FIG. 3, it should be understood that in other examples a different number of wireless communication devices could be included in communication system 300.

Figure 4:
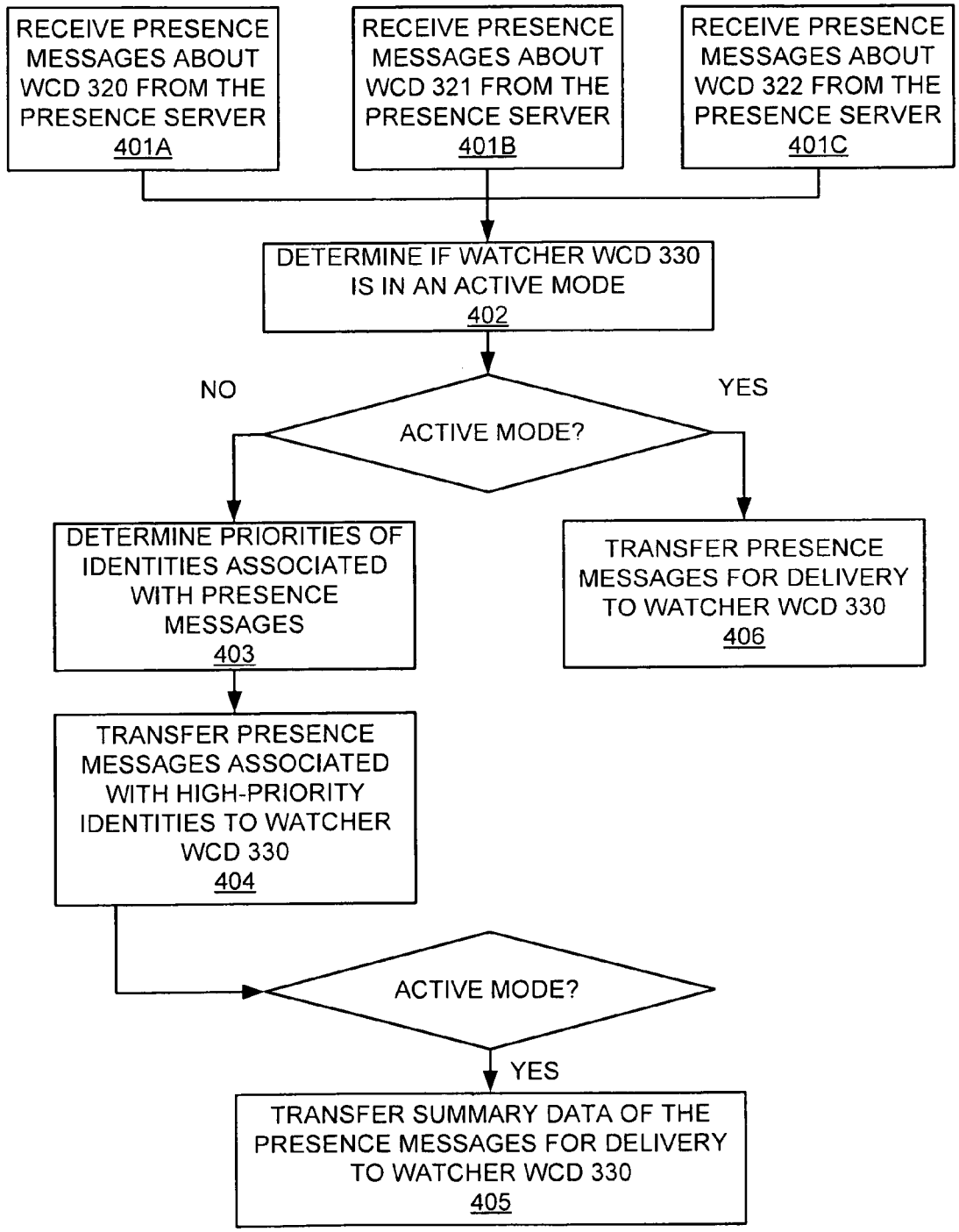
FIG. 4 is a flow diagram illustrating a method of operation of a communication system.

FIG. 4 is a flow diagram illustrating a method of operation of communication system 300, as found in FIG. 3. The operations shown in FIG. 4 are indicated herein parenthetically.

In FIG. 4, gateway 311 of wireless communication system 310 receives (401A-401C) presence messages about each of WCD 320-322 from presence server 340 across Internet 390. In this example, presence server 340 first receives presence information from each of WCD 320-322 from communication network 350 across Internet 390. Presence server 340 then transfers the presence information in various presence messages across Internet 390 for delivery to watcher WCD 330. The presence messages comprise Internet protocol (IP) data packets in this example. Also, as shown in FIG. 3, the presence messages must first pass through gateway 311 via link 391 prior to delivery to further systems and watcher WCD 330.

Also, in this example, gateway 311 could include deep-packet inspection (DPI) equipment. The DPI equipment would allow gateway 311 to inspect the data packets received in wireless communication system 310 from presence server 340 to detect the presence messages and determine if the presence messages are intended for delivery to watcher WCD 330. Further information can be obtained by inspecting the data packets, such as the type of presence message, an identity associated with the presence message, or other information. This information could be used to establish priorities for delivery and the filtering characteristics as discussed herein.

Gateway 311 determines (402) if watcher WCD 330 is in an active mode. The modes of operation could be similar to that discussed above for monitoring wireless communication device 130, including an active mode, an idle mode, among other operating modes. In this example, gateway 311 receives information related to the operating mode of watcher WCD 330 from base station 312. If watcher WCD 330 is in an active mode, gateway 311 transfers (406) the presence messages for delivery to watcher WCD 330. In this example, gateway 311 transfers the presence messages through wireless communication system 310 over link 313 and base station 312.

If watcher WCD 330 is not in an active mode, such as being in an idle mode, gateway 311 determines priorities (403) of the identities associated with the presence messages. In this example, these priorities are filtering characteristics that are applied by gateway 311 to the presence messages.

An example of the priorities of identities associated with the presence messages is illustrated in table 500 of FIG. 5. In FIG. 5, table 500 shows each watched WCD 320-322 in a separate row. An identity is shown associated with each WCD 320-322, corresponding to a person or user of each WCD 320-322. Also, as shown in table 500, each WCD 320-322 identity can be assigned a priority. In this example, the WCDs of 'Bob' and 'Daughter' have a low priority, while the WCD of 'Husband' has a high priority.

Gateway 311 then transfers (404) the presence messages associated with high priority identities for delivery to watcher WCD 330. In this example, gateway 311 transfers the high priority presence messages through wireless communication system 310 over link 313 and base station 312. Also, since watcher WCD 330 would be in an idle mode when gateway 311 transfers the high priority presence messages for delivery to watcher WCD 330, watcher WCD 330 could be forced into an active mode to receive these high-priority presence messages. In this example, the user of watcher WCD 330 would then be notified of the high-priority presence messages, and not notified of the low priority presence messages when watcher WCD 330 was in an idle mode.

Once watcher WCD 330 enters an active mode, gateway 311 transfers (405) summary data of the presence messages for delivery to watcher WCD 330. The entry into an active mode could be prompted by the user of watcher WCD 330, such as in examples where the user first places watcher WCD 330 into an idle mode. In other examples, the receipt of high-priority messages in watcher WCD 330 prompts an entry into an active mode. In this example, gateway 311 receives information related to the operating mode of watcher WCD from base station 312.

The summary data transferred for delivery to watcher WCD 330 could include information related to an associated identity, a count, or other information related to the presence messages missed while watcher WCD 330 was in idle mode. The 'identity' and 'presence messages logged' columns of Table 500, as illustrated in FIG. 5, could also represent the summary data transferred for delivery to watcher WCD 330 when watcher WCD 330 enters an active mode after being in an idle mode.

Advantageously, by determining when watcher WCD 330 is in an idle mode, the low-priority presence messages can be withheld from delivery, thus allowing watcher WCD 330 to remain in an idle mode. By remaining in an idle mode, watcher WCD 330 could reduce power consumption, or reduce the frequency of interruptions by presence messages, among other advantages.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system for communicating a presence message from a presence server to a monitoring wireless communication device, wherein the presence message indicates location-oriented status of a monitored wireless communication device, method comprising:
   in the wireless communication system, receiving the presence message from the presence server and determining if the monitoring wireless communication device is in an active mode;
   responsive to receiving the presence message when the monitoring wireless communication device is in the active mode, in the wireless communication system, transferring the presence message for delivery to the monitoring wireless communication device; and
   responsive to receiving the presence message when the monitoring wireless communication device is not in the active mode and filtering characteristics indicate to transfer the presence message then, in the wireless communication system, transferring the presence message for delivery to the monitoring wireless communication device;
   responsive to receiving the presence message when the monitoring wireless communication device is not in the active mode and the filtering characteristics indicate to withhold transfer of the presence message then, in the wireless communication system, withholding transfer of the presence message to the monitoring wireless communication device, applying the filtering characteristics to the presence message, and creating summary data of the presence message, wherein the summary data comprises an identity of the monitored wireless communication device; and
   responsive to the monitoring wireless communication device entering the active mode, transferring the summary data of the presence message for delivery to the monitoring wireless communication device.

2. The method of claim 1, wherein withholding transfer of the presence message to the monitoring wireless communication device comprises preventing the presence message from causing the monitoring wireless communication device to enter the active mode when the monitoring wireless communication device is not in the active mode.

3. The method of claim 1, wherein the filtering characteristics comprise allowing the presence message to be transferred for delivery to the monitoring wireless communication device when the presence message is associated with a high priority and the monitoring wireless communication device is not in the active mode, and withholding the presence message from transfer for delivery to the monitoring wireless communication device when the presence message is associated with a low priority and the monitoring wireless communication device is not in the active mode;
wherein the presence message transferred for delivery to the monitoring wireless communication device brings the monitoring wireless communication device into the active mode.

4. The method of claim 1, further comprising:
in the wireless communication system, maintaining an active communication session with the presence server on behalf of the monitoring wireless communication device when the monitoring wireless communication device is not in the active mode.

5. The method of claim 1, further comprising:
when the monitoring wireless communication device is not in the active mode, maintaining a log of the presence message in the wireless communication system.

6. The method of claim 1, further comprising:
in the wireless communication system, receiving additional presence messages from the presence server when the monitoring wireless communication device is not in the active mode;
in the wireless communication system, transferring summary data of the additional presence messages for delivery to the monitoring wireless communication device once the monitoring wireless communication device enters the active mode.

7. The method of claim 6, wherein the additional presence messages are associated with additional monitored wireless communication devices; and further comprising:
in the wireless communication system, applying the filtering characteristics to the additional presence messages, wherein the filtering characteristics comprise assigning priorities to each of the presence message and the additional presence messages based upon identities of the monitored wireless communication device and the additional monitored wireless communication devices.

8. The method of claim 6, wherein the additional presence messages are associated with additional monitored wireless communication devices; and further comprising:
in the wireless communication system, applying the filtering characteristics to the additional presence messages, wherein the filtering characteristics comprise assigning priorities to each of the presence message and the additional presence messages based upon a message type of the presence message and the additional presence messages.

9. The method of claim 1, wherein receiving the presence message from the presence server comprises:
in the wireless communication system, inspecting communications transferred from the presence server to detect the presence message; and
in the wireless communication system, determining if the presence message is intended for delivery to the monitoring wireless communication device.

10. A communication system for communicating a presence message from a presence server to a monitoring wireless communication device, wherein the presence message indicates a location-oriented status of a monitored wireless communication device, comprising:
a communication interface of the communication system configured to receive the presence message from the presence server;
a processing node of the communication system configured to determine if the monitoring wireless communication device is in an active mode;
responsive to receiving the presence message when the monitoring wireless communication device is in the active mode, the communication interface is configured to transfer the presence message for delivery to the monitoring wireless communication device; and
responsive to receiving the presence message when the monitoring wireless communication device is not in the active mode and filtering characteristics indicate to transfer the presence message, the processing node is configured to transfer the presence message for delivery to the monitoring wireless communication device;
responsive to receiving the presence message when the monitoring wireless communication device is not in the active mode and the filtering characteristics indicate to withhold transfer of the presence message, the processing node is configured to withhold transfer of the presence message to the monitoring wireless communication device, apply the filtering characteristics to the presence message, and create summary data of the presence message, wherein the summary data comprises an identity of the monitored wireless communication device; and
the communication interface configured to transfer the summary data of the presence message for delivery to the monitoring wireless communication device responsive to the monitoring wireless communication device entering the active mode.

11. The communication system of claim 10, comprising:
the processing node configured to prevent the presence message from causing the monitoring wireless communication device to enter the active mode by withholding transfer of the presence message to the monitoring wireless communication device when the monitoring wireless communication device is not in the active mode.

12. The communication system of claim 10, wherein the filtering characteristics comprise allowing the presence message to be transferred for delivery to the monitoring wireless communication device when the presence message is associated with a high priority and the monitoring wireless communication device is not in the active mode, and withholding the presence message from transfer for delivery to the monitoring wireless communication device when the presence message is associated with a low priority and the monitoring wireless communication device is not in the active mode;
wherein the presence message transferred for delivery to the monitoring wireless communication device brings the monitoring wireless communication device into the active mode.

13. The communication system of claim 10, comprising:
the processing node configured to maintain an active communication session with the presence server on behalf of the monitoring wireless communication device when the monitoring wireless communication device is not in the active mode.

14. The communication system of claim 10, comprising:
the processing node configured to maintain a log of the presence message when the monitoring wireless communication device is not in the active mode.

15. The communication system of claim 10, comprising:
the communication interface configured to receive additional presence messages from the presence server when the monitoring wireless communication device is not in the active mode;
the processing node configured to create additional summary data of the additional presence messages; and
the communication interface configured to transfer summary data of the presence message and the additional summary data of the additional presence messages for delivery to the monitoring wireless communication device once the monitoring wireless communication device enters the active mode.

16. The communication system of claim 15, wherein the additional presence messages are associated with additional monitored wireless communication devices; and comprising:
the processing node configured to apply the filtering characteristics to the additional presence messages, wherein the filtering characteristics comprise assigning priorities to each of the presence message and the additional presence messages based upon identities of the monitored wireless communication device and the additional monitored wireless communication devices.

17. The communication system of claim 15, wherein the additional presence messages are associated with additional monitored wireless communication devices; and comprising:
the processing node configured to apply the filtering characteristics to the additional presence messages, wherein the filtering characteristics comprise assigning priorities to each of the presence message and the additional presence messages based upon a message type of the presence message and the additional presence messages.

18. The communication system of claim 10, comprising:
the processing node configured to inspect communications received by the communication interface from the presence server to detect the presence message and determine if the presence message is intended for delivery to the monitoring wireless communication device.

* * * * *